No. 734,646. PATENTED JULY 28, 1903.
D. L. WINTERS.
GALVANIC BATTERY.
APPLICATION FILED MAY 27, 1903.
NO MODEL.

Attest:
Geo. E. Durand
M. H. Holmes

Inventor:
David L. Winters,
By Robert Burns
Attorney

No. 734,646. Patented July 28, 1903.

UNITED STATES PATENT OFFICE.

DAVID L. WINTERS, OF CHICAGO, ILLINOIS.

GALVANIC BATTERY.

SPECIFICATION forming part of Letters Patent No. 734,646, dated July 28, 1903.

Application filed May 27, 1903. Serial No. 158,921. (No model.)

*To all whom it may concern:*

Be it known that I, DAVID L. WINTERS, a citizen of the United States of America, and a resident of Chicago, in the county of Cook and State of Illinois, have invented certain new and useful Improvements in Galvanic Batteries, of which the following is a specification.

The present invention relates to the terminal connections of galvanic batteries such as are used in series for operating the spark-coils of explosive-engines and other like applications, and has for its object to provide a simple and efficient connecting means for a series of such batteries and by means of which the number of individual batteries in active use can be added to or subtracted from in a ready, rapid, and convenient manner without any interruption of the circuit of the series of batteries, all as will hereinafter more fully appear, and be more particularly pointed out in the claims.

Figure 1:
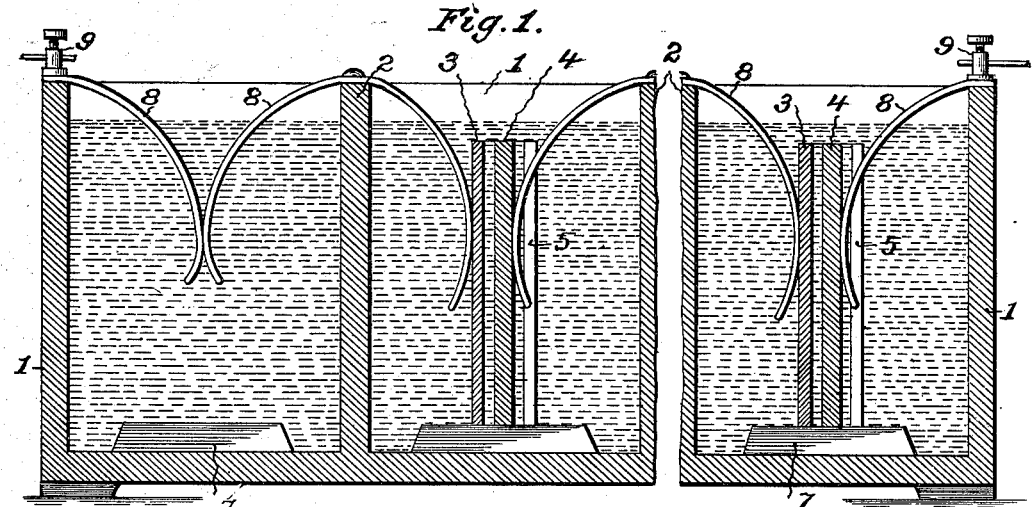
Figure 2:
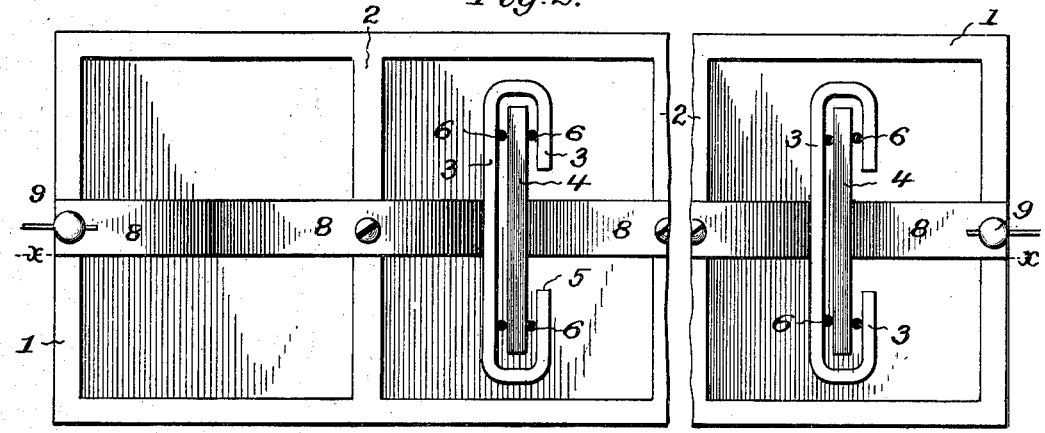
Figure 3:
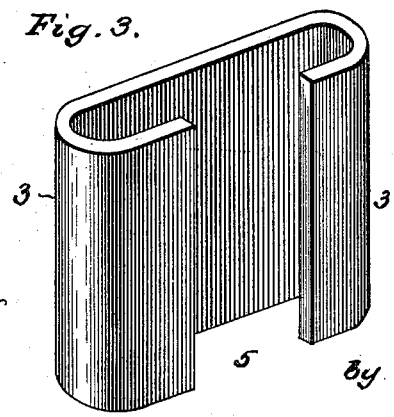

In the accompanying drawings, illustrative of the present invention, Figure 1 is a longitudinal sectional elevation at line $x\ x$, Fig. 2, of a series of batteries embodying the present invention. Fig. 2 is a plan view of the same; Fig. 3, a perspective view of a positive electrode of the battery in a detached condition.

Similar numerals of reference indicate like parts in the different views.

Referring to the drawings, 1 represents the cell-casing of the series of batteries, the same being divided by cross-partitions 2 into the required number of individual battery-cells, as usual in the present type of cell-casings.

3 represents the positive electrodes, and 4 the negative electrodes, of the different cells. In the preferred form of the present invention the negative electrode 4 is of a flat rectangular form, while the positive electrode 3 is of a flat tubular form open at one side along its length to form a vertical gap 5, as shown and for the purpose hereinafter set forth. As so formed the positive electrode 3 incloses the negative electrode 4, and the two are held in spaced and separated relation by means of wedges 6, of insulating material, or by any other usual and equivalent means.

7 represents ribs or projections at the bottoms of the respective cells for supporting the electrodes a distance above said bottoms.

8 represents yielding terminal or contact fingers of metal or other like resilient conducting material secured to the opposite walls and which in the present invention project toward each other, so that in the absence or removal of the electrodes from a particular cell the pair of opposed contact-fingers are adapted to contact one with the other to form a short and metallic circuit across such cell and not disturb or break the main circuit of the battery, and so that with the electrodes introduced into place in such cell the said pair of approved contact-fingers are adapted to contact individually with the respective electrodes to place the same in series in the main battery-circuit, the heretofore-described gap 5 in the positive electrode 3 permitting the contact-finger of the negative electrode to pass and have contact with such negative electrode.

The yielding terminal or contact fingers of the end cells of the battery will be of the single form shown and will be provided with the usual binding screws or posts 9 for the attachment of the line conductors, while the terminal or contact fingers of the intermediate cells of the battery are preferably of the double form shown, secured at their middle portion to the dividing-walls of such cells with their respective free ends projecting into adjacent cells for contact, respectively, with the positive and negative electrodes of such cells, so as to connect the same in series.

With the present construction a rapid and ready change in the number of cells in active use can be effected in that it is only necessary to either withdraw or insert the required number of individual sets of electrodes without the necessity of manipulating binding-posts, wire connections, &c., as has heretofore been required in ordinary battery connections.

Having thus fully described my said invention, what I claim as new, and desire to secure by Letters Patent, is—

1. In a galvanic battery, the combination of a battery-cell, yielding contact-fingers secured at opposite sides of the cell with their free ends extending toward each other and adapted to contact in the absence of the electrodes from a position between such fingers, and positive and negative electrodes adapted to slide into place between said fingers, substantially as set forth.

2. In a galvanic battery, the combination of a battery-cell, positive and negative electrodes therein, means for connecting the electrodes together in spaced and insulated relation, yielding contact-fingers secured at opposite sides of the cell with their free ends extending toward each other and adapted to contact in the absence of the electrodes from a position between such fingers, substantially as set forth.

3. In a galvanic battery, the combination of a battery-cell, positive and negative electrodes therein, yielding contact-fingers secured at opposite sides of the cell with their free ends extending toward each other and adapted to contact in the absence of the electrodes from a position between such fingers, one of said electrodes having a flat tubular form with a vertical gap for the passage of one of said contact-fingers, substantially as set forth.

4. In a galvanic battery, the combination of a series of battery-cells, yielding contact-fingers secured to the walls of the cells with the free ends of each pair of contacts extending toward each other and adapted to contact in the absence of the electrodes from a position between such fingers, and positive and negative electrodes adapted to slide into place between said fingers, substantially as set forth.

5. In a galvanic battery, the combination of a series of battery-cells, positive and negative electrodes therein, means for connecting the electrodes together in spaced and insulated relation, yielding contact-fingers secured to the walls of the cells with the free ends of each pair of contacts extending toward each other and adapted to contact in the absence of the electrodes from a position between such fingers, substantially as set forth.

6. In a galvanic battery, the combination of a series of battery-cells, positive and negative electrodes therein, yielding contact-fingers secured to the walls of the cells with the free ends of each pair of contacts extending toward each other and adapted to contact in the absence of the electrodes from a position between such fingers, one of each pair of electrodes having a flat tubular form with a vertical gap for the passage of one of each pair of contact-fingers, substantially as set forth.

Signed at Chicago, Illinois, this 21st day of May, 1903.

DAVID L. WINTERS.

Witnesses:
ROBERT BURNS,
M. H. HOLMES.